Dec. 1, 1931. N. R. LILLIG 1,834,247
LOCK WASHER
Filed Nov. 24, 1930 2 Sheets-Sheet 2
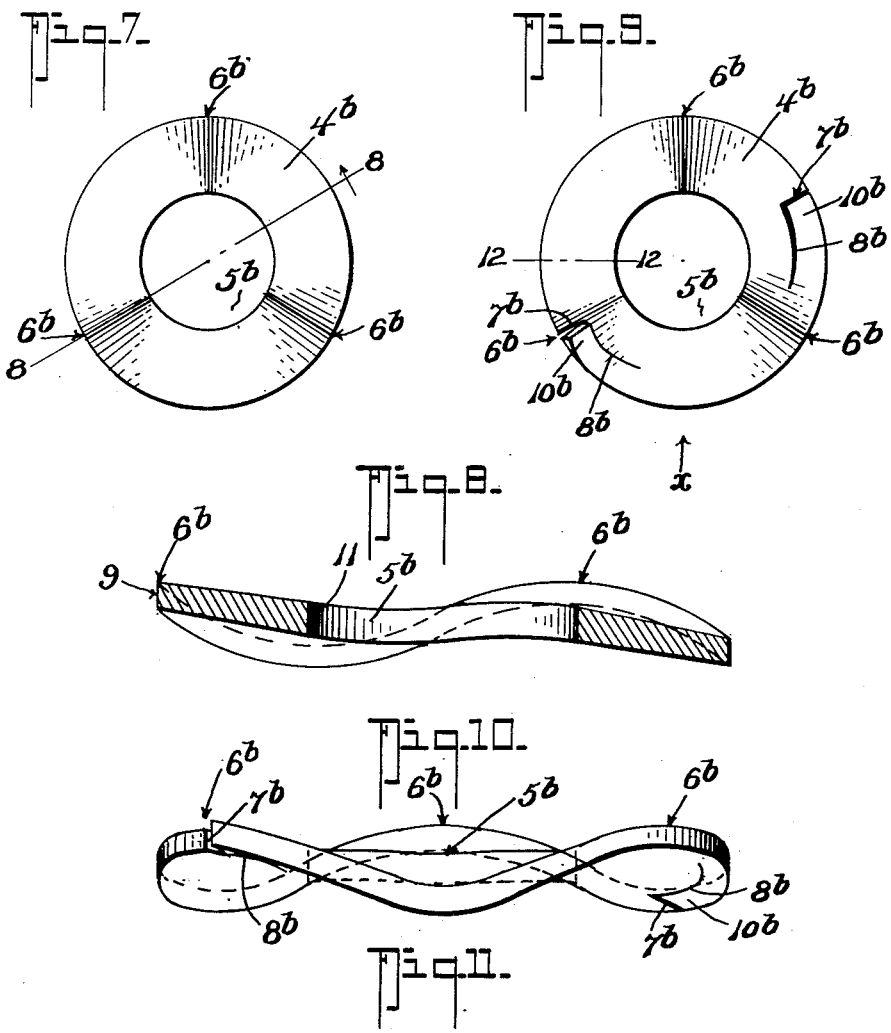
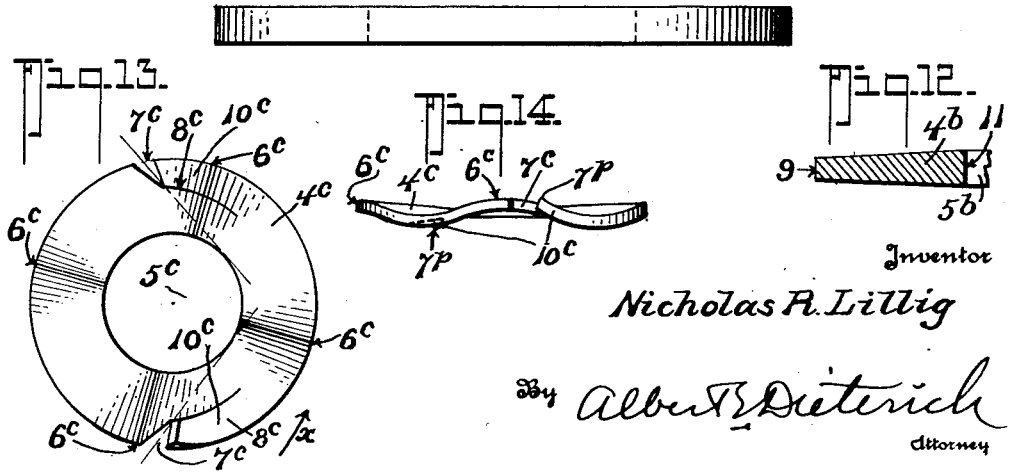
Inventor
Nicholas R. Lillig
By Albert E. Dieterich
Attorney Patented Dec. 1, 1931

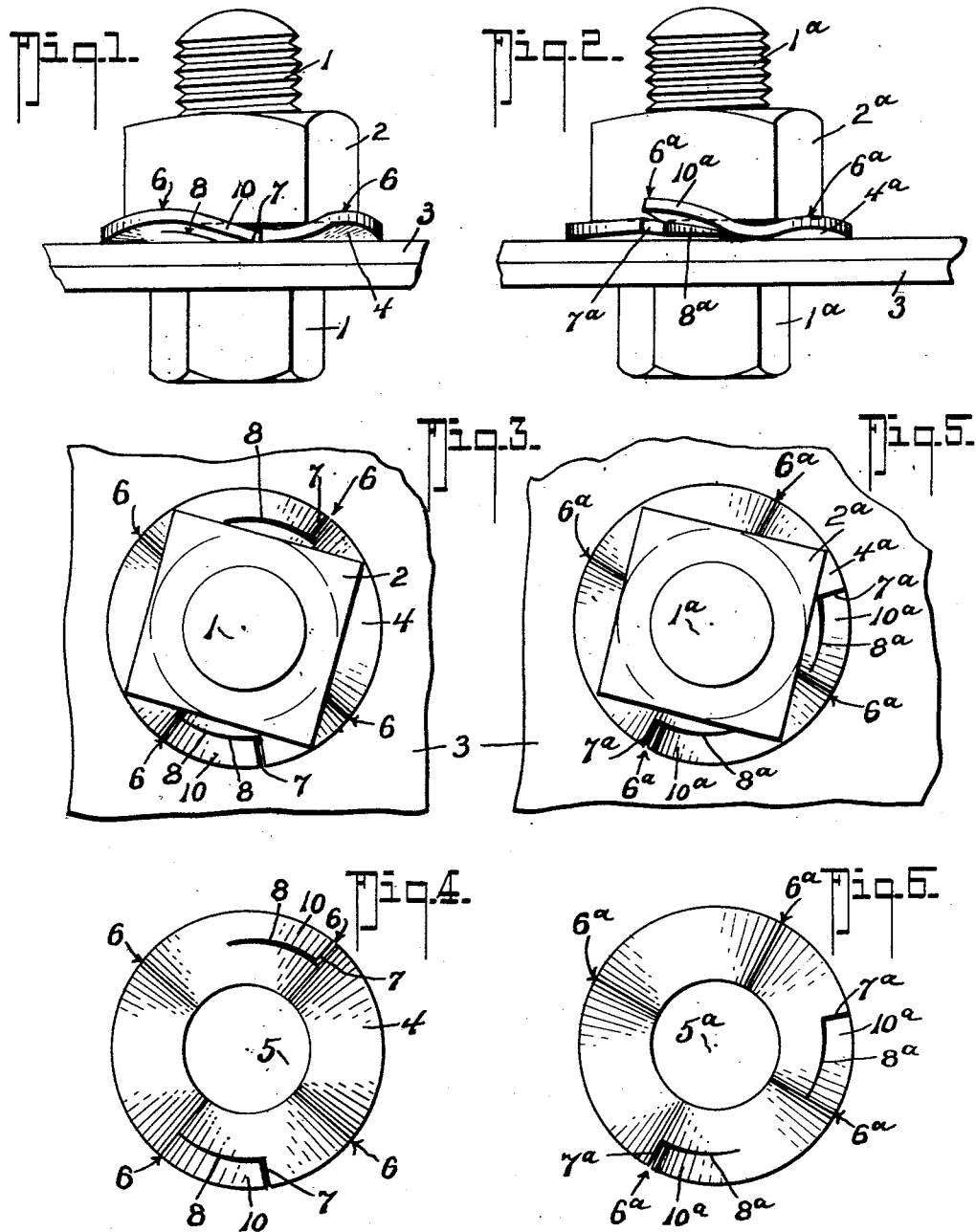

1,834,247

UNITED STATES PATENT OFFICE

NICHOLAS RICHARD LILLIG, OF PORTLAND, OREGON, ASSIGNOR TO TICE LOCK-WASHER MANUFACTURING CO., OF PORTLAND, OREGON, A CORPORATION OF OREGON

LOCK WASHER

Application filed November 24, 1930. Serial No. 497,904.

My invention relates to washers for securing bolts and nuts against coming loose, and my present invention particularly has to do with the provision of lock washers for use where considerable vibration occurs, as for example in rail joints. Track washers frequently come loose due to stretch in the bolt brought about by the variation in temperature as well as by vibration in trains passing over the rail joints; such stretch may also be due to wear in the angle bars and rails. It is therefore an important object of my invention to provide a washer which will compensate for these variations and stretching and will keep the joint tight at all times.

Further, it is an object to provide a washer of resilient type to take up stretch and variations due to expansion or wear which also makes provision for holding the nut locked against unscrewing even though stretch and variation due to temperature changes or wear occur; a washer which will automatically be caused to lock the nut when vibration tends to loosen the nut.

To accomplish these objects I provide a washer having peculiar undulations or waves which are at a maximum at the outer diameter or perimeter of the washer but practically die out before the bolt hole of the washer is reached, thus leaving a substantially flat central portion of the washer with a deeply undulated portion at the circumference, which undulations are so arranged in relation to the corners of the nut to be locked, that they not only give resiliency but they also tend to lock the nut with its corners coinciding with the troughs of the washer.

Further, it is an object of the invention to provide a washer of the characteristics just mentioned which is also provided with definitely locking tongues, one for biting into the part against which the washer is forced and another acting as a tongue to spring up against the side face of the nut to hold the same against turning back or being turned back.

Further, it is an object to provide a washer embodying the novel characteristics aforesaid which will also be reversible, i. e., which may be used either face up.

Further, it is an object to provide a corrugated washer with springy locking tongues to engage the side walls of a nut and so arranged adjacent the periphery of the washer disk and with respect to the peaks and valleys of the undulations as to perform the dual functions of, first, providing notches or cuts in the periphery of sufficient depth to allow the metal of the washer to spread as the washer is flattened and thus reducing cracking or breaking under flattening pressures to the minimum, and secondly to allow the metal of the washer to spread from the body part of the washer rather than from the tongues thereby relieving the tongues of flattening strains so their resiliency may, at all times, be maintained substantially constant.

Further, it is an object to provide for increasing the resiliency of the peripheral portion of the washer disk including the tongues and this is accomplished by having the thickest portion of the metal adjacent the bolt hole and thinning out toward the periphery. This construction aids in reducing the danger of splitting the washer radially from the periphery inwardly.

Further, it is an object to provide a washer of the corrugated type by which the greatest resistance between nut and plate occurs adjacent the bolt hole rather than at the periphery of the washer disk, thereby reducing the tendency of the resisting force to cant the nut and consequently tend to bend the bolt out of alignment.

Other objects will in part be obvious and in part be pointed out hereinafter.

To the attainment of the aforesaid objects and ends, the invention still further resides in the novel details of construction, combination and arrangement of parts all of which will be first fully described in the following detailed description, then be particularly pointed out in the appended claims, reference being had to the accompanying drawings, in which:—

Figure 1 is a side elevation showing the action of one embodiment of my invention.

Figure 2 is an elevation of the same taken at a position of 180° from that of Figure 1.

Figure 3 is a plan of the parts shown in Figure 1.

Figure 4 is a plan of the washer shown in Figure 1.

Figure 5 is a plan similar to Figure 3 showing a modified form of washer in use.

Figure 6 is a plan of the washer shown in Figure 5.

Figure 7 is a plan of a further modification of the invention.

Figure 8 is an enlarged cross section on the line 8—8 of Figure 7.

Figure 9 is a plan of the washer of Figure 7 but showing the same provided with a pair of tongues.

Figure 10 is an enlarged side elevation of the washer shown in Figure 9 looking in the direction of the arrow $x$.

Figure 11 is an edge view of the washer blank before being undulated.

Figure 12 is a detail section on the line 12—12 of Figure 9 showing how the metal is thinned out toward the periphery of the washer after the undulating process has been applied.

Figure 13 is a plan of a slight modification.

Figure 14 is an edge view of the same looking in the direction of the arrow $x$ in Figure 13.

In the drawings, 1 designates the bolt, 2 the nut and 3 the part or parts to which the bolt and nut are applied with clamping pressure.

Referring now particularly to Figures 1, 2, 3 and 4 of the drawings the washer which comprises the embodiment of the invention therein disclosed consists of a body 4 having a bolt hole 5 in its center and formed with undulations having alternate high places 6 and low places midway between adjacent high places when the washer is viewed in the direction of its axis. The washer is preferably slitted as at 7 on radial lines and annularly as at 8 to provide at least two tongues 10, one of the slits 7 being located at a high point 6 and the other slit 7 at a low point between adjacent high points 6, so that when the washer is in use one of the tongues 10 will bite into the body 3 against which it is pressed while the other tongue 10 will rise against one of the flat faces of the nut 2 as a positive locking tongue or back stop to prevent the nut being screwed off, see Figures 1 and 2 respectively. Furthermore, by reason of the peculiarly formed undulations, when a corner of the nut aligns with a depressed part of the washer, the nut will be held by the undulations against accidental turning back.

In the embodiment of the invention shown in Figures 1 to 4 inclusive the tongues 10 are approximately opposite one another across a diameter. In the embodiment shown in Figures 5 and 6, however, the tongues are located closer together. In each case, however, one radial slit is at a high point and the other radial slit is at a low point in the undulations.

In Figures 5 and 6 the parts which correspond to similar parts in Figures 1 to 4 inclusive, bear the same reference numeral plus the index letter $a$.

In Figures 7 to 10 inclusive is shown another embodiment of the invention in which an odd number of undulations are employed instead of an even number as in Figures 1 to 6 inclusive. In these figures the parts which correspond to similar parts in Figure 1 bear the same reference numeral plus the index letter $b$.

As shown in Figure 9, the tongues 10$b$ are formed similarly to those of the preceding embodiments, namely by radial slits 7$b$ and annular slits 8$b$, the one radial slit being at a high point of an undulation while the other is at a low point of an undulation. While the slits 7 and 8 (7$a$, 8$a$ or 7$b$, 8$b$ as the case may be) and the corresponding slits 8, 8$a$, 8$b$ may be made in such a way as not to displace the tongues 10, 10$a$, 10$b$ from the body of the washers, still for some purposes it may be preferable to give the tongues a slight twist so as to raise the outermost corner of a tongue above the surface of the body part of the washer, see Figures 2, 9 and 10, so as to provide a sharp point to dig into the part 3 against which the tongue is pressed.

In Figures 13 and 14 is shown a slight modification adapted particularly for heavy work. For heavy work it has been found that it is advantageous to provide the washer with V-shaped (preferably) notches 7$c$ in lieu of the slits 7, 7$a$ or 7$b$, and to locate the axes of the V-shaped notches approximately tangential to the bolt opening 5$c$ so as to give a sharp chisel point 7$p$ which is preferably slightly offset from the adjacent surface of the washer so as to give the tongues 10$c$ more freedom to dig in deeply when the pressure of the nut is applied.

When the washer is to be used on automobiles or other fine machinery it is preferable that the tongue does not dig in too deeply and therefore in those cases the washers of Figures 1 to 12 inclusive are preferred.

In Figures 13 and 14 those parts which are analogous to corresponding parts in the preceding figures bear the same reference numerals plus the index letter $c$.

The method of manufacturing the washers is to stamp from suitable soft (annealed) sheet metal, of substantially uniform gauge, blanks such as shown in Figure 11, and then the blank is put into a die press which puts in the undulations without substantially increasing the overall diameter of the washer or decreasing the diameter of the bolt hole. The undulating press stretches the washer from perimeter to hole in an annular direction, the stretch being greatest at the perimeter and least adjacent the hole, thereby leaving the original thickness of the washer at the hole but progressively thinning the body of the washer toward the periphery so that the washer blank after it has been undulated is of the same overall diameter, the same central hole diameter, and contains the same amount of metal as was the blank before undulating the same. The washer is then hardened or tempered so as to acquire the proper resiliency and to provide against the metal being displaced when the washer is in use.

The tapering of the body of the washer outwardly toward the periphery also tends to give the washer its greatest resiliency adjacent the periphery where the locking function occurs. Of course the tongues 10 are formed by slitting, as at 7 and 8, the blank before it is tempered or hardened. A washer thus constructed cannot wholly be flattened out at the periphery, because after hardening there is no place for the "stretch" to go to, and therefore there will always be undulations adjacent the periphery of the washer into the troughs of which the corners of the nut may lie and thus be locked against accidental unscrewing. This locking by the undulations is greatly augmented by the tongues 10, one of which is pressed into biting engagement with the body 3 and the other springs up as the corner of the nut passes over it to lie against the side of the nut as a positive back stop. This is a particularly advantageous feature since it prevents the unauthorized unscrewing of the nut, and together with the resiliency of the nut, due to the undulations, and together with the undulating-lock feature, absolutely insures the nut against coming loose in use when expansion and contraction, etc. of the bolt takes place.

In using my present washer it is found that the action of screwing a nut down on the washer is very peculiar. As these undulations are pressed down the tongues either remain in their same positions and the body of the washer is forced away from them, or else the flattening of the washer causes the tongues to rise up. In either case the effect is the same and is that of causing the lower tongue to dig in more and the upper tongue to come higher on the corner of the nut, see Figures 1 and 2.

While in this application I have described a particular method by which the washers may be formed, I wish it understood that the particular method is not a part of the present application but constitutes the subject matter of another application filed on the 21st day of May, 1931, as a continuation in part of this application, the method claims originally presented in this application having been cancelled for purposes of division and carried into said application filed on the 21st day of May, 1931.

Other advantages of the invention will be clear to those skilled in the art, and I desire it understood that slight changes in the details of construction and arrangement of parts may be made without departing from the spirit of the invention as defined by the appended claims.

What I claim is:

1. A lock washer comprising a metal disk having a central bolt hole encircled by an annular body having undulations, the undulations being of greatest magnitude at the periphery and of least magnitude adjacent the hole, said body having radial slits extending inwardly from the periphery and merging with longitudinal slits to leave tongues, the radial slits being located alternately at a highest and a lowest point in the undulations.

2. A lock washer comprising a metal disk having a central bolt hole encircled by an annular body having undulations, the undulations being of greatest magnitude at the periphery and of least magnitude adjacent the hole, said body having radial slits extending inwardly from the periphery and merging with longitudinal slits to leave tongues, the radial slits being located alternately at a highest and a lowest point in the undulations, said longitudinal slits extending in opposite directions whereby the tongues will be directed in opposite ways.

3. A lock washer comprising a metal disk having a central bolt hole encircled by an annular body having undulations, the undulations being of greatest magnitude at the periphery and of least magnitude adjacent the hole, the metal of the body being thickest at the hole and progressively thinner from there toward the periphery.

4. A lock washer comprising a metal disk having a central bolt hole encircled by an annular body having undulations, the undulations being of greatest magnitude at the periphery and of least magnitude adjacent the hole, said body having radial slits extending inwardly from the periphery and merging with longitudinal slits to leave tongues, the metal of the body being thickest at the hole and progressively thinner from there toward the periphery.

5. A lock washer comprising a metal disk having a central bolt hole encircled by an annular body having undulations, the undulations being of greatest magnitude at the periphery and of least magnitude adjacent the hole, said body having radial slits extending inwardly from the periphery and merging with the longitudinal slits to leave tongues, the radial slits being located alternately at a highest and a lowest point in the undulations, the metal of the body being thickest at the hole and progressively thinner from there toward the periphery.

6. A lock washer comprising a metal disk having a central bolt hole encircled by an annular body having undulations, the undulations being of greatest magnitude at the periphery and of least magnitude adjacent the hole, said body having radial slits extending inwardly from the periphery and merging with longitudinal slits to leave tongues, the radial slits being located alternately at a highest and a lowest point in the undulations, said longitudinal slits extending in opposite directions whereby the tongues will be directed in opposite ways, the metal of the body being thickest at the hole and progressively thinner from there toward the periphery.

7. A lock washer comprising a metal disk having a central bolt hole encircled by an annular body having undulations, the undulations being of greatest magnitude at the perpihery and of least magnitude adjacent the hole, said body having radial slits extending inwardly from the periphery and merging with longitudinal slits to leave tongues, the radial slits being located alternately at a highest and a lowest point in the undulations, said longitudinal slits extending in opposite directions whereby the tongues will be directed in opposite ways, said tongues being twisted whereby their outermost corners will lie outside the face surfaces of the body to present digging in points.

8. A lock washer comprising a metal disk having a central bolt hole encircled by an annular body having undulations, the undulations being of greatest magnitude at the periphery and of least magnitude adjacent the hole, said body having radial slits extending inwardly from the periphery and merging with longitudinal slits to leave tongues, said tongues being twisted whereby their outermost corners will lie outside the face surfaces of the body to present digging in points, the metal of the body being thickest at the hole and progressively thinner from there toward the periphery.

9. A lock washer comprising a metal disk having a central bolt hole encircled by an annular body having undulations, the undulations being of greatest magnitude at the periphery and of least magnitude adjacent the hole, said body having radial slits extending inwardly from the periphery and merging with longitudinal slits to leave tongues, the radial slits being located alternately at a highest and a lowest point in the undulations, said longitudinal slits extending in opposite directions whereby the tongues will be directed in opposite ways, said tongues being twisted whereby their outermost corners will lie outside the face surfaces of the body to present digging-in points, the metal of the body being thickest at the hole and progressively thinner from there toward the periphery.

10. A lock washer comprising a metal disk having a central bolt hole encircled by an annular body having undulations, the undulations being of greatest magnitude at the periphery and least magnitude adjacent the hole, said disk containing the same mass of metal as that of a flat blank of the same overall diameter as the finished washer and having a bolt hole of the same diameter as that of the finished washer.

11. A lock washer comprising a metal disk having a central bolt hole encircled by an annular body having undulations, the undulations being of greatest magnitude at the periphery and of least magnitude adjacent the hole, said body having inwardly directed notches at the periphery, the inner extremities of which merge with longitudinal slits to leave tongues the metal of the disk being thickest at the hole and progressively thinner from there toward the periphery.

12. A lock washer comprising a metal disk having a central bolt hole encircled by an annular body having undulations, the undulations being of greatest magnitude at the periphery and of least magnitude adjacent the hole, said body having inwardly directed V-shaped notches at the periphery, the apexes of which merge with longitudinal slits to leave tongues, the axes of the V-shaped notches lying approximately tangential to the bolt hole the metal of the disk being thickest at the hole and progressively thinner from there toward the periphery.

13. A lock washer comprising a metal disk having a central bolt hole encircled by an annular body having undulations, the undulations being of greatest magnitude at the periphery and of least magnitude adjacent the hole, said body having inwardly directed V-shaped notches at the periphery, the apexes of which merge with longitudinal slits to leave tongues, the outermost extremity of the tongues being offset from the adjacent surfaces of the body to leave sharp chisel corners for digging in the metal of the disk being thickest at the hole and progressively thinner from there toward the periphery.

NICHOLAS RICHARD LILLIG.